United States Patent [19]

Kamio

[11] Patent Number: 4,546,866

[45] Date of Patent: Oct. 15, 1985

[54] CUSHIONING PLATE ASSEMBLY OF A CLUTCH DISC

[75] Inventor: Takenori Kamio, Neyagawa, Japan

[73] Assignee: Kabushiki Kaisha Daikin Seisakusho, Osaka, Japan

[21] Appl. No.: 578,957

[22] Filed: Feb. 10, 1984

[30] Foreign Application Priority Data

Feb. 25, 1983 [JP] Japan .................................. 58-31477

[51] Int. Cl.[4] ...................... F16D 11/00; F16D 13/60
[52] U.S. Cl. ................................................ 192/107 C
[58] Field of Search ............ 192/107 R, 107 C, 106.1

[56] References Cited

U.S. PATENT DOCUMENTS 3,695,405 10/1972 Maucher et al. ........... 192/107 C X

FOREIGN PATENT DOCUMENTS 1213292 11/1970 United Kingdom ............ 192/107 C

Primary Examiner—Edward G. Favors
Attorney, Agent, or Firm—Burns, Doane, Swecker & Mathis

[57] ABSTRACT

The present disclosure describes a cushioning plate assembly of a clutch disc comprising a plurality of cushioning plates adapted to be disposed between a flywheel and a pressure plate and fixed to an outer peripheral portion of a clutch plate of a clutch disc; a front facing to be pressed to the flywheel and fixed to portions of the cushioning plates; and a rear facing to be pressed to the pressure plate and fixed to another portions of the cushioning plates; said cushioning plates having elastically deformable portions which deform so that substantially full surfaces of the facings may be pressed against the flywheel and the pressure plate respectively in engaged condition of the clutch.

8 Claims, 4 Drawing Figures

FIG. 1
*(PRIOR ART)*
FIG. 2
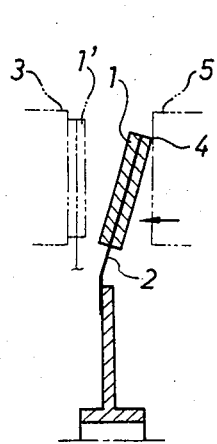
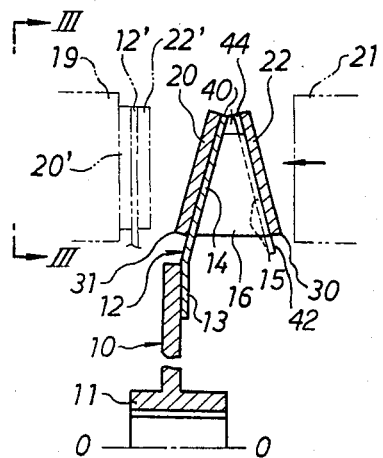
FIG. 3
FIG. 4
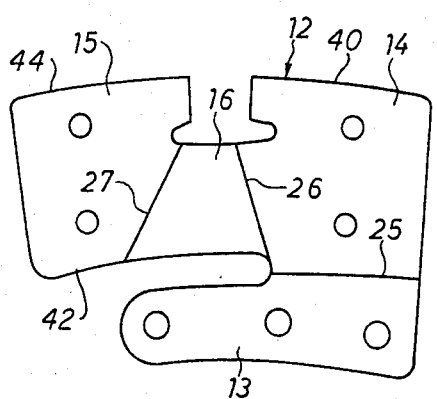
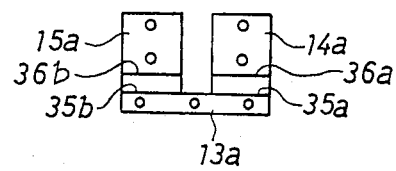

CUSHIONING PLATE ASSEMBLY OF A CLUTCH DISC

BACKGROUND AND SUMMARY OF THE INVENTION

The present invention relates to a cushioning plate assembly of a friction clutch disc having a friction facing of a conical shape.

Some of conventional clutch discs have already employed structures as shown in FIG. 1. According to the structures in FIG. 1, a friction facing 1 returns to a conical shape from a flat shape indicated by a numeral 1' by elastical restoring force of cushioning plates 2 and separates and disengages from a flywheel 3 in a clutch disengaging operation. Therefore, the disc may be prevented from insufficient disengagement to some extent. However, according to this conventional disc, an outer peripheral portion 4 of the facing 1 may contact a pressure plate 5 in the disengagement operation. Therefore, it is impossible to satisfactorily prevent the insufficient disengagement. Further, in an engaging operation of the clutch, the outer peripheral portion 4 initially contact the pressure plate 5, so that a rather large torque is transmitted to the disc from the start of the engaging operation. Therefore, it is difficult to delicately control the transmitted torque.

Accordingly it is an object of the invention to provide an improved cushioning plate assembly, overcoming the above-noted disengagement.

BRIEF DESCRIPTION OF THE DRAWINGS

FIG. 1 is a schematic sectional view of a conventional clutch disc;

FIG. 2 is a schematic sectional view of a clutch disc of an embodiment of the invention;

FIG. 3 is a schematic elevation view of a cushioning plate taken line III—III in FIG. 2; and FIG. 4 is a schematic elevation view of a cushioning plate of another embodiment.

DETAILED DESCRIPTION OF THE PREFERRED EMBODIMENTS

Referring to FIG. 2, a clutch disc 10 of a type having torsion springs (not shown) is splined at its central hub 11 to an output shaft (not shown) having a front-to-rear extending axis of rotation or center line 0—0. A plurality of cushioning plates 12 are riveted at respective base ends 13 to a radially outer portion of an annular clutch plate of the disc 10. The cushioning plates 12 are arranged annularly. Each plate 12 integrally has the base end 13 as well as a front plate portion 14, rear plate portion 15 and a connecting plate portion 16. The front and rear plate portions 14, 15 extend generally laterally from the connecting plate portion 16 in opposite directions, which directions are oriented generally circumferentially relative to the axis of rotation 0—0. An annular front friction facing 20 is fixed by rivets (not shown) or adhesive to the front surface, facing a flywheel of an engine, of the front plate portion 14. An annular rear facing 22 is fixed by rivets (not shown) or adhesive to the rear surface, facing a pressure plate 21, of the rear plate portion 15. The plates 12 are bent so that both facings 20 and 22 may have conical shapes and that the outer peripheries of the facings 20 and 22 may be adjacent to each other. The front plate portion 14 continues to the outer periphery 25 of the base end portion 13. The front and rear plate portions 14 and 15 continue to each other with the connecting portion 16 therebetween. More particularly, each cushioning plate 12 is constructed as follows.

Referring to FIG. 3, a blank of the plate 12 is made of a plate formed by blanking or the like. This blank is folded or bent at fold lines 25, 26 and 27 to form the plate 12. The fold 25 is formed between the base end portion 13 and the front plate portion 14. The base end portion 13 is substantially perpendicular to the center line 0—0 of the output shaft. The front plate portion 14 is inclined outwardly and rearwardly toward the pressure plate 21 with respect to the base end portion 13 with the fold 25 therebetween. The front fold 26 determines one side edge of the front end portion 14, i.e., a front edge of the connecting plate portion 16. The connecting portion 16 is inclined rearwardly with respect to the front plate portion 14 with the fold 26 therebetween. The fold 27 rear determines a rear edge of the portion 16 opposite to the fold 26. The rear plate portion 15 is inclined inwardly and rearwardly with respect to the connection portion 16 with the fold 27 therebetween.

The front and rear fold lines 26, 27 extend generally toward the axis 0—0 as can be seen in FIG. 2. The rear plate portion 15 is inclined relative to the front plate portion (FIG. 2) as viewed in a direction generally transversely to the face of the connecting plate portion 16, (or generally perpendicularly to a plane containing the axis 0—0 and intersecting the connecting plate portion 14, 15). The innermost edge 25 of the front plate portion 14 is located farther forwardly than an outermost edge 40 thereof, and a rearmost edge 42 of the rear plate portion 15 is disposed farther rearwardly than an uppermost edge 44 thereof (see FIG. 2).

The operation of the preferred embodiment will be explained in the following description. In an engaging operation of the clutch, the pressure plate 21 moves from a relaxed state shown in FIG. 2 toward the flywheel 19, so that the facings 20 and 22 deform to flate shapes as shown by alternate long and two short dashes line 20' and 22' and gripped by the flywheel 19 and the pressure plate 21 to engage the clutch. In this engaged condition, the plates 12 elastically deform at the folds 25, 26 and 27 to align the portions on a plane perpendicular to the center line 0—0. By this electrical deformation, the plates 12 function as a cushioning means, which prevent a rapid and sudden increasement of the pressure of the facings 20 and 22 against the flywheel 19 and the pressure plate 21. Therefore, the clutch engages smoothly. Initially in this engaging operation, only a radially inner portion of the facing 22 contacts the pressure plate 21, and then a radially inner portion 31 of the facing 20 contacts the flywheel 19. Therefore, in the initial operation, effective diameters of the facings 20 and 22 are small, and a torque transmitted to the disc 10 is very small. Thus, a half or incompletely engaged condition of the clutch can be delicately controlled.

In a disengagement operation of the clutch, the pressure plate 21 returns, so that the plates 12 return to the initial incline shapes by the elastical restoring force, and the facings 20 and 22 return to the conical shapes. Therefore, the facings 20 and 22 actively separate from the flywheel 19 and the pressure plate 21, respectively, and the clutch surely disengages. In this disengaged condition, even if the facings 20 and 22 contact the flywheel 19 or the pressure plate 21, the contact portion is restricted in the inner peripheral portion 30 or 31 of the facings 20 or 22. Therefore, only a torque of a negligible extent is transmitted, and thus, any insufficient disengagement is prevented.

According to the invention, as stated hereinbefore, the contact portions of the facings 20 and 22, which contact the flywheel 19 and the pressure plate 21 in the disengaged condition, are restricted in the inner peripheral portions 30 and 31 of the facings 20 and 22, and the effective diameter is small. Therefore, the drag or draft torque is very small, and the insufficient disengagement can be completely prevented. Further, in the start of the engaging operation, since the effective diameter of the facings 20 and 22 is small, the tranmitted torque is very small, and the half engaged condition can be controlled delicately. The cushioning effect of the plates 12 is increased, resulting in an advantage that the engaging operation can be smooth.

The plate 12 in FIG. 3 has such advantage that the portions 15 and 16 can be cut off from the blank in FIG. 3 to easily manufacture the conventional plate 2 in FIG. 1.

In modifications of the invention, the front plate portion 14 may be positioned on a same plane as the base end portion 13 or may be inclined toward the flywheel 19.

In a modification in FIG. 4, there is a space between a front plate portion 14a and a rear plate portion 15a, which integrally continue to different portions of a base end portion 13a, respectively. A portion between folds 35a and 36a is inclined forwardly with respect to the portion 13a. A portion between folds 35b and 36b is inclined rearwardly with respect to the portion 13a. The portion 14a and 15a are inclined similarly as the portions 14 and 15 in FIG. 2. Each plate 12 in FIG. 3 or 4 may be divided into several portions which are fixed together by rivets or welding. Different parts may be used as cushioning plates for the front facing and the rear facing. The cushioning plates may be integral with an annular clutch plate.

Although the invention has been described in its preferred form with a certain degree of particularity, it must be understood that the details of construction may be changed and the combination and arrangement of parts may be varied without departing from the scope of the invention as hereinafter claimed.

What is claimed:

1. A clutch mechanism of the type adapted to be compressed between a flywheel and a pressure plate, said clutch mechanism comprising:
   an annular clutch disc rotatable about a front-to-rear extending axis of rotation, and
   a plurality of cushioning plates spaced circumferentially around an outer periphery of said clutch disc, each said cushioning plate comprising a one-piece member integrally including
   a base end connected to said clutch disc,
   a front plate portion extending outwardly from said base end in a direction away from said axis of rotation and oriented generally circumferentially relative to said axis of rotation,
   a connecting plate portion extending rearwardly from said front plate portion and joined to said front plate portion along a front fold line extending generally toward said axis of rotation,
   a rear plate portion extending generally circumferentially from said connecting plate portion in a direction opposite said first plate portion and joined to said connecting plate portion along a rear fold line extending generally toward said axis of rotation, said rear plate portion being inclined relative to said front plate portion as viewed in a direction generally perpendicular to a plane containing said axis of rotation and intersecting said connecting plate portion, and
   front and rear facings carried by said front and rear plate portions, respectively, and adapted to be compressed between a pressure plate and a flywheel during a clutching operation,
   said front and rear fold lines defining elastic flexure lines about which said front and rear plate portions flex elastically relative to said connecting plate portion during the clutching operation.

2. A clutch mechanism according to claim 1, wherein said front plate portion is inclined relative to said base end to define an additional fold line therewith about which said front plate portion flexes elastically during a clutching operation.

3. A clutch mechanism according to claim 2, wherein an innermost edge of said front plate portion is situated farther forwardly than an outermost edge of said front plate portion, and an innermost edge of said rear plate portion is situated further rearwardly than an outermost edge of said rear plate portion.

4. A clutch mechanism according to claim 1, wherein an innermost edge of said front plate portion is situated farther forwardly than an outermost edge of said front plate portion, and an innermost edge of said rear plate portion is situated farther rearwadly than an outermost edge of said rear plate portion.

5. A cushioning plate adapted to be mounted to a clutch disc and be compressed between a pressure plate and a flywheel during a clutching operation, said cushioning plate comprising a one-piece member which integrally includes:
   a base end adapted to be connected to a clutch disc,
   a front plate portion extending outwardly from said base end as an extension thereof and being adapted to carry a front facing,
   a connecting plate portion extending laterally and rearwardly from said front face portion and joined to said front face portion along a front edge of said connecting plate portion which defines a front fold line, said connecting plate portion including a rear edge spaced rearwardly from said front edge, and
   a rear plate portion joined to said connecting plate portion along said rear edge thereof to define a rear fold line, said rear plate portion extending laterally from said connecting plate portion in a direction opposite said front plate portion, said rear plate portion being inclined with respect to said front portion as viewed in a direction generally transversely to the face of said connecting plate portion and being adapted to carry a rear facing,
   said front and rear fold lines defining elastic flexure lines about which said front and rear plate portions flex elastically relative to said connecting plate portion during a clutching operation in which said front and rear plate portions are pushed together.

6. A clutch mechanism according to claim 5, wherein said front plate portion is inclined relative to said base end to define an additional fold line therewith about which said front plate portion flexes elastically during a clutching operation.

7. A clutch mechanism according to claim 6, wherein an innermost edge of said front plate portion is situated farther forwardly than an outermost edge of said front plate portion, and an innermost edge of said rear plate portion is situated farther rearwardly than an outermost edge of said rear plate portion.

8. A clutch mechanism according to claim 5, wherein an innermost edge of said front plate portion is situated farther forwardly than an outermost edge of said front plate portion, and an innermost edge of said rear plate portion is situated farther rearwardly than an outermost edge of said rear plate portion.

* * * * *